(12) United States Patent
Willemsen

(10) Patent No.: US 6,319,558 B1
(45) Date of Patent: Nov. 20, 2001

(54) PROCESS FOR MANUFACTURE OF SUPERABSORBENT-COATED YARN

(75) Inventor: Stephanus Willemsen, Rhoden (NL)

(73) Assignee: Akzo Nobel NV, Arnhem (NL)

( * ) Notice: Subject to any disclaimer, the term of this patent is extended or adjusted under 35 U.S.C. 154(b) by 0 days.

(21) Appl. No.: 09/486,066

(22) PCT Filed: Aug. 5, 1998

(86) PCT No.: PCT/EP98/05123

§ 371 Date: Mar. 6, 2000

§ 102(e) Date: Mar. 6, 2000

(87) PCT Pub. No.: WO99/10591

PCT Pub. Date: Mar. 4, 1999

(30) Foreign Application Priority Data

Aug. 22, 1997 (EP) .................................................. 97202583

(51) Int. Cl.$^7$ ........................................................ B05D 3/02

(52) U.S. Cl. ..................................... 427/389.8; 427/389.9

(58) Field of Search ............................... 427/389.8, 389.9

(56) References Cited

U.S. PATENT DOCUMENTS

| | | | |
|---|---|---|---|
| 4,090,013 | * 5/1978 | Ganslaw et al. | ......................... 526/15 |
| 4,320,081 | 3/1982 | Lammers . | |
| 4,888,238 | * 12/1989 | Katz et al. | ............................ 427/212 |
| 4,913,517 | 4/1990 | Arroyo et al. . | |
| 5,249,248 | 9/1993 | Arroyo et al. . | |
| 5,264,251 | 11/1993 | Geursen et al. . | |
| 5,342,686 | 8/1994 | Guersen et al. . | |
| 5,534,304 | 7/1996 | Geursen et al. . | |
| 5,635,569 | 6/1997 | Sackmann et al. . | |

FOREIGN PATENT DOCUMENTS

| | | |
|---|---|---|
| 0351100 A | 1/1990 | (EP) . |
| 0482703 A | 4/1992 | (EP) . |
| 0544435 A | 6/1993 | (EP) . |
| 536308 * | 2/1994 | (EP) . |
| 702031 * | 3/1996 | (EP) . |
| 708119 * | 4/1996 | (EP) . |
| 0779389 A | 6/1997 | (EP) . |
| 0784116 A | 7/1997 | (EP) . |
| WO 93 18223 | 9/1993 | (WO) . |
| WO 96/23024 | 8/1996 | (WO) . |

OTHER PUBLICATIONS

Kirk–Othmer, Encyclopedia of Chemical Technology, 3$^{rd}$ Edition, vol. 10 (1980), pp. 148–197.
Kirk–Othmer, Encyclopedia of Chemical Technology, 3$^{rd}$ Edition, vol. 3 (1978), pp. 213–242.

* cited by examiner

Primary Examiner—Erma Cameron
(74) Attorney, Agent, or Firm—Oliff & Berridge, PLC

(57) ABSTRACT

A process for the manufacture of a yarn provided with a superabsorbent material having a swelling value of at least 60 and having hydrophilic properties which is capable of absorbing and retaining quantities of water, wherein the process includes applying an aqueous solution of a water-soluble pre-superabsorbent material onto the yarn followed by drying and heating of the yarn in order to cross-link or to polymerize the water-soluble pre-superabsorbent material to the superabsorbent material. The superabsorbent material provides water blocking capability to the yarn so that it is suitable for use as a strength member in watertight optical communication cables.

11 Claims, No Drawings

PROCESS FOR MANUFACTURE OF SUPERABSORBENT-COATED YARN

BACKGROUND OF THE INVENTION

1. Field of the Invention

The invention relates to a process for the manufacture of yarn provided with a superabsorbent material.

Said yarn can be utilized in cables, more particularly optical communications cables, in this way functioning simultaneously as reinforcing member and as water blocking agent.

A yarn provided with a superabsorbent material and the manufacture of such a yarn are known from European Patent Applications 482,703 and 351,100, U.S. Pat. No. 5,635,569, and PCT application WO 93/18223. According to these publications yarns are impregnated with a superabsorbent material in a water-oil emulsion. After being impregnated the treated yarn is dried, so that a film is formed in and around the yarn's interstices. The resulting product is used as reinforcing material for the manufacture of a communications cable with water blocking properties.

However, there are drawbacks to the above-mentioned methods of applying a superabsorbent material to a cable or yarn surface. A major disadvantage is the release of organic materials, in particular isohexadecane, during the process of drying the yarn. Such organic materials form an unacceptable environmental burden, and isohexadecane must be eliminated by burning or by treatment in a waste gas unit. Such step requires expensive equipment and uses substantial amounts of energy. It is therefore an advantage to eliminate the use of water-oil emulsions, and to apply materials which are water soluble.

The drawback to impregnating an aramid yarn with a superabsorbent material dispersed in an aqueous system is that, due to the superabsorbent material's high viscosity enhancing action, uniform feeding of it is extremely difficult, if not impossible. Further, on account of the limited concentration of superabsorbent material in the impregnating liquid only a small quantity of it can be applied to the yarn per treatment. Another drawback to this method is that the comparatively large amount of impregnating liquid which is applied to the yarn with the superabsorbent material has to be removed again by evaporation.

SUMMARY OF THE INVENTION

The present invention obviates the aforesaid drawbacks. Moreover, the invention provides an aramid multifilament yarn of excellent water absorbing capacity without using organic solvents or excessive amount of water.

The invention consists of a process for the manufacture of a yarn provided with a superabsorbent material having a swelling value of at least 60 and having hydrophilic properties which is capable of absorbing and retaining quantities of water, characterized in that an aqueous solution comprising a water-soluble pre-superabsorbent material is applied onto the yarn, after which the yarn is dried and heated in order to cross-link or to polymerize the water-soluble pre-superabsorbent material to the superabsorbent material.

DETAILED DESCRIPTION OF PREFERRED EMBODIMENTS

Thus no superabsorbent material as such is longer used but a water-soluble precursor which after heat treatment polymerizes or cross-links to superabsorbent material. This process may be followed by a step wherein a finish is applied onto the yarn. Alternatively, the aqueous solution already comprises the finish.

The yarn obtained must have a swelling value greater than 60. The swelling value is a measure of the quantity of water absorbed by the yarn when it is contacted with water in the liquid form. The method of experimentally determining the swelling value will be illustrated in greater detail below. It was found that the yarn according to the invention has swelling values comparable to the above-mentioned prior art yarns. Preferably, the swelling value of the yarn according to the invention is at least 80, more particularly at least 100, and more particularly still at least 150.

The term multifilament yarn has the meaning it customarily has in the art, i.e., the fibers of which it is made are endless filaments. *Textile Terms and Definitions* (1988), pages 289–290 is referred to in this respect. Within the framework of the invention the fibers used in making the yarns according to the invention are filaments which may have any linear density common in actual practice, and yarns may be made up of any desired number of endless filaments. Generally, the filaments or the yarns composed thereof will have a linear density of 0.01 to 20 000 dtex, while the endless filament yarns will be composed of 1 to 20 000 filaments.

As suitable types of fibers may be mentioned fibers of organic as well as inorganic origin. The fibers of organic origin may be either natural or synthetic. Examples of natural fibers include cellulose fibers such as cotton, linen, jute, etc., and fibers of animal origin such as wool, silk, etc. Examples of synthetic organic fibers include fibers of regenerated cellulose, rayon, polyesters, aliphatic and aromatic polyamides, acrylonitrile, polyolefins, polyvinyl alcohol, polyvinyl chloride, polyphenylene sulfide, elastomers, and carbon. Examples of inorganic fibers include fibers of glass, metals, silica, quartz, etc., ceramic fibers, and mineral wool. In addition, fibers made up of mixtures of said materials or copolymers thereof or mixtures of said fibers may be employed. The aforementioned types of fibers and other ones suitable for use in the process according to the invention have been described in Kirk-Othmer, *Encyclopedia of Chemical Technology*, $3^{rd}$ Edition, Vol. 10 (1980), pp. 148–197.

Preference is given to fibers composed of aramid, polyethylene terephthalate, nylon-6, nylon-6,6, regenerated cellulose, or glass. Also highly suitable as a substrate are fibers composed of two or more of the aforementioned materials, e.g. bicomponent fibers. They may be of the sheath-core or the side by side type, or of some other well known type. Other suitable types of fibers are satellite fibers and split fibers.

The fibers may be either solid or hollow. They may be round or flat or of any other desired cross-sectional shape, e.g. elliptical, triangular, star-shaped, kidney-shaped, etc.

Aramid yarns are most preferred. By aramid yarns is meant according to the invention yarns composed of polymers built up wholly or substantially from recurring units of the general formula:

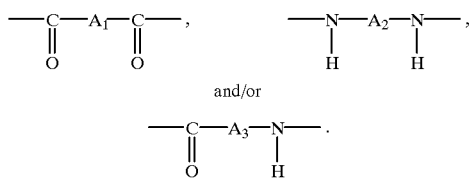

and/or

Herein $A_1$, $A_2$, and $A_3$ represent different or the same divalent, one or more aromatic rings-containing rigid radicals which may also contain a heterocyclic ring, the chain-extending bonds of which radicals are in the position para to each other or are parallel and oppositely directed. Examples of such radicals include 1,4-phenylene, 4,4'-biphenylene, 1,5-naphthylene, and 2,6-naphthylene. They may contain substituents or not, e.g. halogen atoms or alkyl groups. In addition to amide groups and the aforementioned aromatic radicals the chain molecules of the aromatic polyamides may optionally contain up to 35 mole % of other groups, e.g. m-phenylene groups, non-rigid groups such as alkyl groups, or ether groups, urea groups or ester groups. Preferably, the aramid yarn is made up wholly or in part, more particularly for over 90 wt. %, of poly-(p-phenylene terephthalamide).

By a pre-superabsorbent material is meant according to the invention a material that after heating polymerizes or cross-links to a superabsorbent material having hydrophilic properties which is capable of absorbing and retaining a comparatively large quantity of water, optionally under pressure. In order to simply apply the solution onto the yarn it is required that the pre-superabsorbent material dissolved in an aqueous solution has a viscosity smaller than 1000 $mm^2sec^{-1}$. Preferably, the viscosity is smaller than 500 $mm^2sec^{-1}$, and most preferably between 10 and 200 $mm^2sec^{-1}$. Particularly suitable for use as pre-absorbent materials are derivatives of polyacrylic acid. These include the water-soluble monomers, oligomers, and polymers derived from acrylamide, from acrylamide and sodium acrylate, and from acrylamide and dialkylaminoethyl methacrylate. These compounds are selected from the groups of water-soluble non-ionic, anionic, and cationic monomers, oligomers, and polymers, respectively. Examples of pre-superabsorbents that can be used in the manufacture of the yarns according to the invention include: cross-linkable acrylic acid partially neutralized into the sodium salt, poly-potassium acrylate, co-oligo- or co-polymers of sodium acrylate and acrylamide, derivatives of co-polymers of acrylic acid and acrylamide, teroligo- or terpolymers of acrylamide and carboxyl groups and sulfo groups-containing monomers (sodium salt), polyacrylamide oligo- or polymers. Preferably, as pre-superabsorbent material a derivative of polyacrylic acid or a derivative of a co-polymer of acrylamide and acrylic acid is used.

The term derivatives means that part of the carboxylic groups is in the salt form, preferably a potassium or sodium salt.

The yarns of the invention are made using a process wherein on the yarn surface there is provided a layer of a water solution comprising a pre-superabsorbent material, and that next the water is wholly or partially removed from the yarn by evaporation and thereafter or simultaneously heated to cross-link or polymerize the pre-superabsorbent material. Optionally, a cross-linker or polymerization catalyst may be added to the aqueous solution of the pre-superabsorbent material.

The process to make the yarns according to the invention renders it possible to produce high quality aramid yarns having superabsorbent properties in an economical manner without using expensive equipment for after-burning organic solvents.

The amount of superabsorbent on the yarn is selected such that favorable water blocking properties are obtained when the yarn is used in cables. Favorable results are usually obtained if the yarn contains 0.3–10 wt. %, preferably 0.5–5 wt. %, and more particularly 0.6–2 wt. % of the superabsorbent material.

The water solution having been applied, the yarn is dried. In this process the water is wholly or for the most part removed from the yarn by evaporation, so that a uniform layer of the superabsorbent material is left on the yarn surface.

Drying takes place according to the conventional methods, in which use may be made of means such as hot drums, hot sheets, hot rollers, hot gases, tube ovens, steam boxs, infrared radiators, and the like. The drying temperature is 50 to 300° C. Heating is performed at 100 to 300° C. Preferably, drying and heating is performed simultaneously at 100 to 250° C.

The process for obtaining the yarns according to the invention can be carried out in several ways.

In the fully continuous manner, which is linked directly to the yarn spinning process, the water solution containing the pre-superabsorbent can be applied to the washed yarn, after which the thus treated yarn is dried and heated. According to another embodiment, treatment of the yarn with the pre-superabsorbent present in a water solution, takes places in a separate process not integrated with the spinning process.

The process for obtaining the yarns according to the invention is particularly suited to be used for combining, in one and the same process step, a heat treatment to cross-link or polymerize the pre-absorbent material, such as is employed in the production of high-modulus aramid yarns.

In Kirk-Othmer, *Encyclopedia of Chemical Technology*, $3^{rd}$ Ed., Vol. 3 (1978), pp. 213–242 a summary of aromatic polyamide preparation and spinning is provided. A pre-eminently suitable technique for wet spinning poly(p-phenylene terephthalamide) is described in U.S. Pat. No. 4,320,081.

The aramid yarns according to the invention can have any linear density and any number of endless filaments common in actual practice. Generally, the yarn will have a linear density of 10 to 20 000 dtex and be composed of 10 to 20 000 filaments.

The superabsorbent material applied to the yarn according to the invention does not have a negative effect on the filament's principal mechanical properties.

The tenacity of the aramid yarns according to the invention is 1.0–3.5 N/tex or higher, preferably 1.5–2.5 N/tex. The elongation at break is 0.5–10%, preferably 1–8%. The initial modulus is 20–130 N/tex or higher, preferably 30–90 N/tex.

Like the corresponding yarn not treated with a superabsorbent, the yarn according to the invention has a relatively low water content after drying, even after it has been exposed to the air for a longer period of time. After the dried aramid yarn has been conditioned at 20° C. and a relative humidity of 65% for 4 weeks, it has a water content not exceeding 10 wt. %, more particularly not exceeding 7 wt. %.

The procedure to determine the swelling value of the yarn according to the invention is as follows.

About 10 g of the yarn to be examined are cut into non-intertwisted fibers of some 12 cm in length.

The fiber sample is immersed completely, without stirring, in 600 ml of demineralized water of 20–22° C. in an 800 ml beaker. For 60 seconds (measured by stopwatch) the fiber sample remains immersed in the water in a condition of complete rest, i.e. without being stirred, shaken, vibrated, or subjected to some other form of movement. Immediately afterwards the overall contents of the beaker, i.e. fibers and water, are transferred to a bag (dimensions: about 10 cm×15 cm) made of polyester curtain netting (mesh size 1.5 mm×1 mm). In this process the water for the most part runs out through the meshes of the curtain netting, while the fibers are left in the bag. Next, the bag and its contents are straight away transferred to a centrifuge and then centrifuged for 120 seconds (measured by stopwatch), thus removing the still adhering water from the impregnated fiber sample. The centrifuge used is an AEG of the type SV 4528 (ex AEG Aktiengesellschaft, D-8500 Nuremberg), operates at a rate of 2800 revolutions per minute, and has a centrifugal drum with an inner diameter of about 24 cm. Immediately after it has been centrifuged the fiber sample is transferred from the bag to a weighing box with a pair of tweezers and weighed to an accuracy of 0.0001 g (fiber weight: a grams). The fiber sample in the weighing box is thereupon dried to constant weight in an air oven at 105° C. Usually a drying time of 24 hours will suffice. After that the weight of the dried fiber sample in the weighing box is determined to an accuracy of 0.0001 g (fiber weight: b grams).

The swelling value of the yarn is calculated by means of the following formula:

$$\text{swelling value} = \frac{(a-b) \cdot 100}{b}$$

Each determination is carried in duplicate and the results are averaged.

Because of the properties mentioned herein before the yarn obtained according to the invention is extremely well suited to be used as a reinforcing yarn of high water blocking capacity. Consequently, it is pre-eminently suitable for use in cables, more particularly optical communications cables.

The invention will be further illustrated with reference to the following examples.

EXAMPLE I

A 19%-solution of sodium polyacrylate in water (Mirox W 60336, ex Stockhausen GmbH, Krefeld, Germany, viscosity 122 mm$^2$sec$^{-1}$ determined with Ubbelohde meter) was further dissolved in demineralized (demin) water. The solution was applied onto unfinished Twaron® yarn (1680 dtex/f 1000) with a dosage pump and an applicator. After drying in a steam box (length 10 m, 200–220° C., 15–60 sec) the swelling values were determined. The content of Mirox on the yarn was determined to be 2 wt. %.

The results are depicted in Table I:

TABLE I

| wt. % of Mirox solution | 42.1 | 42.1 | 42.1 | 42.1 | 42.1 | 42.1 | 79.0 | 79.0 | 79.0 |
|---|---|---|---|---|---|---|---|---|---|
| wt. % of demin water | 57.9 | 57.9 | 57.9 | 57.9 | 57.9 | 57.9 | 21.0 | 21.0 | 21.0 |
| concentration of Mirox in solution (%) | 8.0 | 8.0 | 8.0 | 8.0 | 8.0 | 8.0 | 15.0 | 15.0 | 15.0 |
| heating (sec)* | 30 | 40 | 50 | 60 | 15 | 20 | 30 | 40 | 50 |
| heating (° C.) | 200 | 200 | 200 | 200 | 220 | 220 | 200 | 200 | 200 |
| yarn speed (m/min) | 20 | 15 | 12 | 10 | 40 | 30 | 20 | 15 | 12 |
| swelling value | 210 | 139 | 78 | 60 | 192 | 81 | 178 | 107 | 66 |

*in steam box

At shorter heating times no cross-linking or polymerization occurs, and consequently swelling values are lower than 60.

Alternatively, the samples can be dried and heated in a tube oven (length 67 cm, 200° C.), or on a hot-plate (length 42 cm, 150° C.).

EXAMPLE II

A 15%-solution of sodium acrylate/acrylamide copolymer in water (Produkt W 63194, ex Stockhausen GmbH, Krefeld, Germany, viscosity 191 mm$^2$sec$^{-1}$ determined with Ubbelohde meter) was further dissolved in demineralized (demin) water, and optionally Glyoxal (aq. glyoxal dialdehyde solution); ex Sigma-Aldrich Chemie bv, Zwijndrecht, The Netherlands), Sarpifan MKV (modified melamine resin solution in water; ex Stockhausen GmbH, Krefeld, Germany), Breox 50A50 (ethoxylated and propoxylated butanol; ex INSPEC, Southampton, UK), and/or Leomin AN (ethoxylated phosphonate potassium salt; ex Clariant, Frankfurt, Germany) were added (see Table II). The solution was applied onto unfinished Twaron® yarn (1680 dtex/f 1000) with a dosage pump and an applicator. After drying in a steam box (length 10 m) the swelling values were determined. The tables show the influence of the amount of finish on the yarn, and the effect of the residence time and the temperature.

TABLE II

| | compositions | | | | | | | |
|---|---|---|---|---|---|---|---|---|
| | A | B | C | D | E | F | G | H |
| wt. % Produkt solution | 75.0 | 50.0 | 25.0 | 12.5 | 75.0 | 50.0 | 50.0 | 50.0 |
| Concentration of Produkt in solution (%) | 11.25 | 7.5 | 3.75 | 1.875 | 11.25 | 7.5 | 7.5 | 7.5 |
| wt. % Glyoxal (50%) | 1.5 | 1.0 | 0.5 | 0.25 | | | 1.0 | 1.0 |
| wt. % Sarpifan (50%) | | | | | 1.5 | 1.0 | | |
| wt. % Breox | | | | | | | 4.0 | |
| wt. % Leomin | | | | | | | | 4.0 |
| wt. % of demin water | 23.5 | 49.0 | 74.5 | 57.25 | 23.5 | 49.0 | 45.0 | 45.0 |

TABLE III swelling values as the result of residence time

| composition | steam box | | | swelling value |
|---|---|---|---|---|
| 2.0%* | m/min | sec | °C. | (%) |
| B | 75 | 8 | 200 | 263 |
| B | 40 | 15 | 200 | 233 |
| B | 30 | 20 | 200 | 242 |
| B | 20 | 30 | 200 | 239 |
| B | 15 | 40 | 200 | 301 |
| B | 12 | 50 | 200 | 316 |
| B | 10 | 60 | 200 | 306 |

*amount of finish composition on yarn

TABLE IV swelling values as the result of the amount of finish

| composition | steam box | | | swelling value |
|---|---|---|---|---|
| (%)* | m/min | sec | °C. | (%) |
| no finish | 15 | 40 | 200 | 25 |
| D(0.5) | 15 | 40 | 200 | 74 |
| C(1.0) | 15 | 40 | 200 | 134 |
| B(2.0) | 15 | 40 | 200 | 304 |
| A(3.0) | 15 | 40 | 200 | 343 |
| F(2.0) | 15 | 40 | 200 | 63 |
| E(3.0) | 15 | 40 | 200 | 72 |

*amount of finish composition on yarn

TABLE V swelling values as the result of the temperature

| composition | steam box | | | swelling value |
|---|---|---|---|---|
| 2.0%* | m/min | sec | °C. | (%) |
| B | 15 | 40 | 160 | 165 |
| B | 15 | 40 | 198 | 198 |
| B | 15 | 40 | 220 | 91 |
| B | 15 | 40 | 240 | 68 |
| F | 15 | 40 | 160 | 214 |
| F | 15 | 40 | 198 | 94 |

*amount of finish composition on yarn

TABLE VI swelling values as the result of the residence time

| composition | steam box | | | swelling value |
|---|---|---|---|---|
| 2.0%* | m/min | sec | °C. | (%) |
| F | 75 | 8 | 200 | 219 |
| F | 40 | 15 | 200 | 85 |
| F | 20 | 30 | 200 | 71 |
| F | 10 | 60 | 200 | 61 |

*amount of finish composition on yarn

TABLE VII swelling values as the result of the surfactant and residence time

| composition | steam box | | | swelling value |
|---|---|---|---|---|
| 3.0%* | m/min | sec | °C. | (%) |
| G | 75 | 8 | 200 | 265 |
| H | 75 | 8 | 200 | 32 |
| G | 75 | 8 | 240 | 164 |
| H | 75 | 8 | 240 | 26 |
| H | 40 | 15 | 240 | 353 |

*amount of finish composition on yarn

What is claimed is:

1. A process for the manufacture of an endless yarn provided with a superabsorbent material having a swelling value of at least 60 and having hydrophilic properties which is capable of absorbing and retaining water, the process comprising applying an aqueous solution comprising a water-soluble pre-superabsorbent material onto the yarn, followed by drying and heating the yarn in order to cross-link or polymerize the water-soluble pre-superabsorbent material to the superabsorbent material.

2. The process according to claim 1, further comprising applying a finish onto the yarn.

3. The process according to claim 1, wherein the aqueous solution further comprises a finish.

4. The process according to claim 1, wherein the yarn comprises a multifilament aramid or glass yarn.

5. The process according to claim 1, wherein the water-soluble pre-superabsorbent material is a derivative of polyacrylic acid or a derivative of a co-polymer of acrylamide and acrylic acid.

6. The process according to claim 4, wherein the yarn is a multifilament aramid yarn having a tenacity of 1.0 to 3.5

N/tex, an elongation at break of 0.5 to 10%, and an initial modulus of 20 to 130 N/tex.

7. The process according to claim 1, wherein the yarn is comprised of a material selected from the group consisting of aramid, polyethylene terephthalate, nylon-6, nylon-6,6, regenerated cellulose and glass.

8. The process according to claim 1, wherein the aqueous solution has a viscosity smaller than 1,000 mm$^2$sec$^{-1}$.

9. The process according to claim 1, wherein the aqueous solution further comprises a cross-linker or polymerization catalyst.

10. The process according to claim 1, wherein the yarn provided with a superabsorbent material contains 0.3 to 10 wt. % of the superabsorbent material.

11. The process according to claim 1, wherein the drying and heating is performed simultaneously at a temperature of from 100° C. to 250° C.

* * * * *

UNITED STATES PATENT AND TRADEMARK OFFICE
CERTIFICATE OF CORRECTION

PATENT NO.     : 6,319,558 B1
DATED          : November 20, 2001
INVENTOR(S)    : Stephanus Willemsen It is certified that error appears in the above-identified patent and that said Letters Patent is hereby corrected as shown below:

<u>Column 7,</u>
Table II, column D, last entry (for "wt.% of demin water"), change "57.25" to -- 87.25 --.

Signed and Sealed this

Twenty-seventh Day of August, 2002

Attest:

Attesting Officer

JAMES E. ROGAN
*Director of the United States Patent and Trademark Office*